United States Patent
Holzner (10) Patent No.: US 8,915,683 B2
(45) Date of Patent: Dec. 23, 2014

(54) LATCH DEVICE FOR SECURING AND/OR GUIDING AT LEAST ONE CARGO ITEM

(71) Applicant: Telair International GmbH, Miesbach (DE)

(72) Inventor: Richard Holzner, Stephanskirchen (DE)

(73) Assignee: Telair International GmbH (DE)

( * ) Notice: Subject to any disclaimer, the term of this patent is extended or adjusted under 35 U.S.C. 154(b) by 0 days.

(21) Appl. No.: 13/889,935

(22) Filed: May 8, 2013

(65) Prior Publication Data
US 2013/0309036 A1 Nov. 21, 2013

(30) Foreign Application Priority Data
May 15, 2012 (DE) .......................... 10 2012 104 235

(51) Int. Cl.
*B60P 7/08* (2006.01)
*B64D 9/00* (2006.01)

(52) U.S. Cl.
CPC ................. *B60P 7/08* (2013.01); *B60P 7/0815* (2013.01); *B64D 9/003* (2013.01)
USPC .......................................................... 410/69

(58) Field of Classification Search
USPC ........... 410/69, 77–80, 92, 94, 95; 244/118.1, 244/137.1; 414/536; 248/500
See application file for complete search history.

(56) References Cited

U.S. PATENT DOCUMENTS

| 4,696,609 | A | 9/1987 | Cole |
| 5,011,348 | A | 4/1991 | Jensen et al. |
| 5,871,317 | A | * | 2/1999 | Huber et al. ..................... 410/79 |
| 6,270,300 | B1 | 8/2001 | Huber et al. |

FOREIGN PATENT DOCUMENTS

| DE | 19544796 C1 | 5/1997 |
| DE | 102010017535 A1 | 12/2011 |

* cited by examiner

*Primary Examiner* — H Gutman
(74) *Attorney, Agent, or Firm* — Barnes & Thornburg LLP (57) ABSTRACT

The present invention relates to a latch device for securing and/or guiding at least one cargo item on a cargo deck, wherein the latch device comprises:
  a sliding guide carriage extending longitudinally;
  a bearing in which the sliding guide carriage is movably supported in such a way that the sliding guide carriage is pivotable out of a restraining position into an inoperative position;
  at least one releasing device which is attached to the latch device by way of at least one articulation in such a way that the releasing device can be brought out of a blocking position into a releasing position, wherein in the blocking position the releasing device acts on the sliding guide carriage in such a manner that said carriage is locked in the restraining position,
wherein the releasing device has at least one releasing device ramp section which is designed and arranged in such a manner that a cargo item approaching longitudinally pivots the releasing device out of the blocking position into the releasing position.

17 Claims, 6 Drawing Sheets

LATCH DEVICE FOR SECURING AND/OR GUIDING AT LEAST ONE CARGO ITEM

BACKGROUND

The invention relates to a latch device for securing and/or guiding at least one cargo item.

In the cargo hold of an aircraft, in particular of a wide-body aircraft, cargo items (e.g. containers or pallets, ULD: unit load devices) are usually moved by means of roller conveyors. Fixing rails (e.g. profile rails) which are mounted on the aircraft's cargo loading deck are used to accommodate functional elements. Such functional elements may be latch devices/fastening devices for at least partial securing of cargo items. The latch devices may also be integrated directly in the cargo hold.

Corresponding latch devices are used not only for securing the cargo items in their end position but also for guiding the cargo items in a specified direction. The cargo items are frequently driven by means of freight conveying devices (PDU: power drive units) with the result that it is necessary to specify a defined direction by using the latch devices. Cargo holds are frequently divided by means of a plurality of latch devices into a plurality of cargo loading paths which are adapted to the size of the cargo items.

A faulty cargo loading system, whether this is due to incorrect operation or normal wear, can lead to substantial costs since it is very expensive to maintain a wide-body aircraft. Every minute that a wide-body aircraft spends on the ground costs the operator money.

Furthermore, it must be considered that weight plays a crucial role when transporting cargo by aircraft. Attempts are therefore made to minimise the dead weight of the aircraft, in particular of the cargo loading system. Attempts are made to provide a plurality of configurations of the cargo loading deck with as few functional elements (e.g. latch devices) as possible.

Furthermore, the loading and unloading of relevant wide-body aircraft should also be carried out as quickly as possible. Loading and unloading is preferably either partially automated or fully automated. The functional elements guide the cargo items during loading and unloading, e.g. by specifying cargo loading paths. When conveying the cargo items into the interior of the cargo hold, it is extremely problematic if the cargo items become jammed inside a cargo loading path. In these cases, this may result in damage to the cargo loading system. In the most favourable case, a manual intervention is necessary in order to re-align the cargo items in an appropriate manner. This intervention costs valuable time.

U.S. Pat. No. 5,011,348 discloses a fastening device which is installed in the centre of a cargo loading deck along the aircraft's longitudinal direction and which serves there as a guide. This central bar (centre guide) has two locking claws, attached to each of which is a locking lug, said locking lugs pointing in opposing directions. The locking lugs are designed to grip partial sections of the cargo items, to secure them in the aircraft's transverse direction (Y-axis) and to hold them firmly in such a manner that the cargo items cannot be lifted out of the guide. The locking claws are articulatedly supported on a frame such that they can be folded away longitudinally when they are passed over by a cargo item. The mechanism associated with this is very complex and costly. The whole construction of the latch device disclosed in U.S. Pat. No. 5,011,348 is very large and requires sufficient space. In addition, the latch device has a heavy and complicated construction such that numerous elements can fall out in the harsh environment in which it is used.

In addition, a foldable latch device for securing and/or guiding at least one cargo item is disclosed in DE 10 2010 017 535 A1. This can be moved in the aircraft's transverse direction to adjust the width of the cargo conveying paths to the cargo items. The latch device has two locking lugs each pointing in opposing directions which can secure the cargo items in two adjacent parallel cargo conveying paths. This latch device is relatively bulky which means that adequate space must be provided for it in the cargo loading deck. The latch device cannot be mounted in existing profile rails. Moreover, the latch device of DE 10 2010 017 535 A1 is not very suitable for guiding cargo items while they are being conveyed in a cargo conveying path, which means that the cargo item may turn sideways within the cargo conveying path. The result of this is that the latch device folds away out of its restraining position into its inoperative position. In the inoperative position, it can easily be passed over by the cargo item which, although this prevents damage to the latch device, nevertheless leads to a delay in the loading process.

U.S. Pat. No. 6,270,300 B1 discloses a further latch device which is provided with pivotable lugs which requires a minimum width of 2 inches between two cargo items or ULDs. If this latch device were to be constructed with rigid lugs to achieve a smaller minimum width, the result when the cargo item is pivoted would (frequently) be jamming as it would drag with it the edge of a cargo item passing alongside. It is essential to prevent such stopping of a moving cargo item (ULD).

Based upon this prior art, it is an object of the present invention to provide an improved latch device for securing and/or guiding at least one cargo item. In particular, the intention is to provide a latch device which ensures safe guidance of the cargo items, which is preferably pivotable into a non-operative position/inoperative position and/or can be mounted in existing profile rails.

In particular, the object is achieved by a latch device for securing and/or guiding at least one cargo item on a cargo deck/cargo loading deck, wherein the latch device comprises:

a sliding carriage extending longitudinally;

a bearing in which the sliding guide carriage is movably supported in such a way that the sliding guide carriage is pivotable out of a restraining position into an inoperative position;

at least one releasing device which is attached to the latch device by way of at least one articulation in such a way that the releasing device can be brought out of a blocking position into a releasing position, wherein in the blocking position the releasing device acts on the sliding guide carriage in such a manner that said carriage is locked in the restraining position, wherein the releasing device has at least one releasing device ramp section which is designed and arranged in such a manner that a cargo item approaching longitudinally pivots the releasing device out of the blocking position into the releasing position.

One advantage of the invention is that the latch device can be configured very compactly. It is possible to mount this latch device in or within a relatively narrow profile rail, which also has, for example, roller drive units, passive rollers and/or latches which secure the cargo items in the aircraft's longitudinal or transverse direction. The separate configuration of the releasing device prevents unintentional lowering of the sliding guide carriage when cargo items approach the sliding guide carriage laterally or are in contact with it. When approaching the latch device longitudinally, however, the sliding guide carriage is released with the result that it can be pivoted out of the restraining position into the inoperative position or it moves aside automatically. The ramp section enables automatic triggering of the releasing device such that it is pivoted out of the blocking position into the releasing position by an approaching cargo item. In the blocking position, the releasing device blocks the sliding guide carriage such that it remains firmly in the restraining position. In the releasing position of the releasing device, it is possible to switch between restraining position and inoperative position of the sliding guide carriage. In the restraining position of the sliding guide carriage, said carriage can hold onto and guide cargo items while in the inoperative position the sliding guide carriage can be passed over by cargo items.

Using the latch device according to the invention, it is possible to equip a cargo loading deck in such a way that cargo items with different dimensions can be transported easily and securely. It is relatively easy to convert the cargo loading deck. In addition, the pivotability of the sliding guide carriage ensures that even with incorrect handling the latch device and/or cargo items are not damaged, as the sliding guide carriage simply descends—along the longitudinal direction—as long as it is approached laterally.

The latch device's transverse direction is preferably defined such that it runs perpendicular to the latch device's longitudinal direction. For pivoting the releasing device between the blocking position and the releasing position, however, it is not necessary for the cargo item to travel towards the releasing device ramp section from exactly the longitudinal direction. This releasing device ramp section is preferably configured in such a manner that a cargo item which is travelling towards the latch device substantially along the longitudinal direction will activate the releasing device.

The latch device can have at least two releasing devices which are arranged on either side of the sliding guide carriage. In this respect, the direction from which the cargo item travels towards the sliding guide carriage is irrelevant for triggering of the releasing device as long as the direction of approach runs substantially perpendicular to the transverse direction of the latch device. A releasing device for releasing the sliding guide carriage can be located on each side of the sliding guide carriage.

The sliding guide carriage, the first and the second releasing device may be arranged substantially in a line running along the longitudinal direction.

It is conceivable for a mechanical coupling to exist between the releasing device and the sliding guide carriage. In this case, when the releasing device is pivoted out of the blocking position into the releasing position, it is possible for the sliding guide carriage to pivot automatically out of the restraining position into the inoperative position against the force of a lifting spring. On the other hand, the sliding guide carriage may have at least one sliding guide carriage ramp section which is arranged and configured in such a way that a cargo item approaching longitudinally will pivot the released sliding guide carriage out of the restraining position into the inoperative position. In this respect, a cargo item approaching longitudinally first releases the sliding guide carriage (triggering of the releasing device) and then, by means of the sliding guide carriage ramp section, pushes the sliding guide carriage out of the restraining position into the inoperative position.

The latch device preferably has two sliding guide carriage ramp sections, which are each arranged on either side of the sliding guide carriage such that the sliding guide carriage can be approached from both sides.

The bearing may have a slotted guide system and/or a plurality of rotary joints which are used to guide the sliding guide carriage out of the restraining position into the inoperative position. The sliding guide carriage preferably executes a translatory movement on moving out of the restraining position into the inoperative position. Provided that this translatory movement is implemented by means of rotary joints, the sliding guide carriage can be folded down like a parallelogram. This special configuration of the bearing has the advantage that jamming of the sliding guide carriage is prevented when switching between the restraining position and the inoperative position. Thus the sliding guide carriage may have locking lugs or similar restraining devices which are suitable for engaging in the cargo items in such a manner that said cargo items are also secured horizontally. These restraining devices can easily jam on the cargo item during rotational movements.

As already explained, the sliding guide carriage may have locking lugs which protrude transversally in order to engage in the cargo items. The sliding guide carriage preferably comprises a cross member and a longitudinal member for forming a T-section. Ultimately, the sliding guide carriage may be relatively flat such that the cargo items are guaranteed to be well secured. In addition, the flat design of the sliding guide carriage ensures the prevention of breakdowns due to incorrect operation. The latch device can also be used as a traversable guide if no cross member is provided.

The releasing device may comprise extensions which accommodate the releasing device ramp sections. The extensions may be arranged and/or aligned along the longitudinal direction of the latch device.

These extensions are preferably narrow in width, in particular less than 3 cm, in particular less than 2 cm.

The narrow width of the extension has the advantage that unintentional unlatching is eliminated. That is to say, a cargo item approaching transversally cannot activate the releasing device. The extension preferably has a lateral surface which ultimately extends parallel to the sliding guide carriage such that cargo items approaching transversally cannot activate the releasing device.

The at least one extension may have a width that is narrower than the width of the sliding guide carriage's cross member. For example, the width of the extension may be narrower than half the width of the cross member.

The latch device may have at least one spring assembly which preloads the sliding guide carriage in the restraining location/restraining position. In this respect, it is conceivable that the move out of the inoperative position into the restraining position is more or less automatic. Furthermore, a spring assembly which preloads the releasing device in the blocking position can also be provided. Here too, it is conceivable that the releasing device is automatically pivoted out of the releasing position into the blocking position by means of the spring assembly.

A blocking mechanism which renders it possible to lock the restraining carriage in the inoperative position may be provided. If the spring assemblies referred to above are present and the sliding guide carriage is in the inoperative position, the carriage can pivot automatically into the restraining position after triggering of the blocking mechanism and can be locked there by means of the releasing device.

The latch device may comprise a latch plate for fastening the latch device to the cargo loading deck and/or a profile rail.

The latch device according to the invention is preferably mounted in a profile rail.

The object referred to at the outset can moreover be achieved by a cargo loading deck comprising at least one latch device such as has been described previously.

The at least one latch device can be arranged centrally on the cargo loading deck to form at least one first cargo conveying path and at least one second cargo conveying path. The cargo loading deck is preferably configured in such a manner that a plurality of cargo conveying paths differing in their widths can be provided depending on the cargo loading deck's configuration. For example, a cargo conveying path approx. 125 inches wide can be divided by means of the latch device according to the invention into two cargo conveying paths approx. 62 inches wide such that cargo items with a width of 125 inches or 62 inches can be loaded depending on the configuration. In a different arrangement, a wider cargo conveying path could be divided, for example, into three or four tracks.

The invention is described below with reference to several embodiment examples which will be explained in more detail with reference to several drawings.

DESCRIPTION

In the following description, the same reference numerals are used for identical parts and parts acting in an identical manner.

Figure 1:
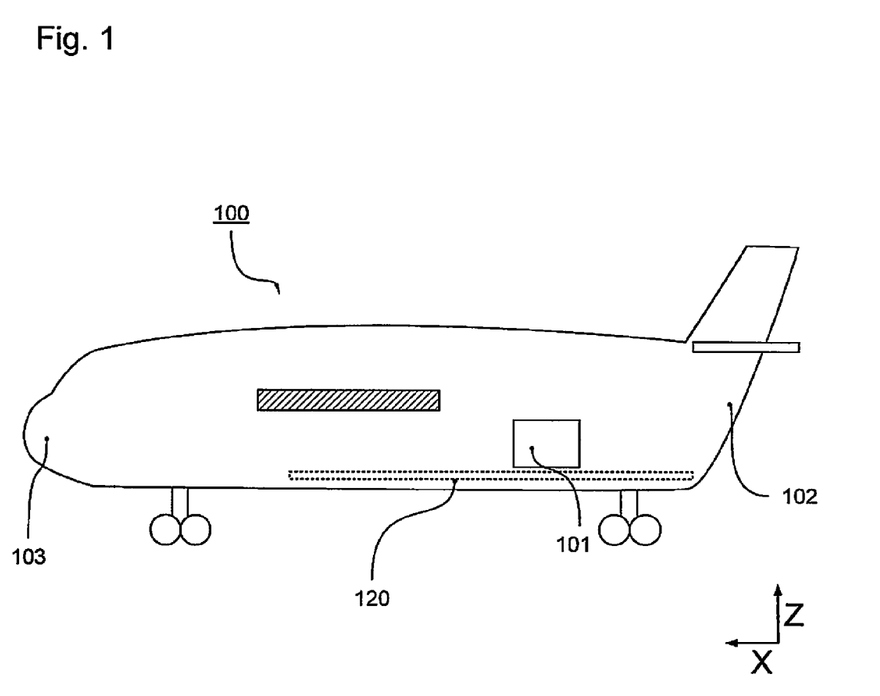
FIG. 1 a schematic representation of an aircraft with a cargo loading deck.

FIG. 1 shows a lateral view of an aircraft 100. Aircraft 100 extends substantially along a longitudinal axis of the aircraft, namely aircraft longitudinal axis X, wherein a nose 103 is situated in the front section and a tail 102 in the rear section. The Z-axis of aircraft 100 extends upwards normal to aircraft longitudinal direction X. Located on the side of aircraft 100 is a cargo hatch 101 through which cargo items are loaded into aircraft 100 and out of which they can be unloaded again. A cargo loading deck 120 which is accessible via cargo hatch 101 extends along the X-Y plane of aircraft 100.

Figure 2:
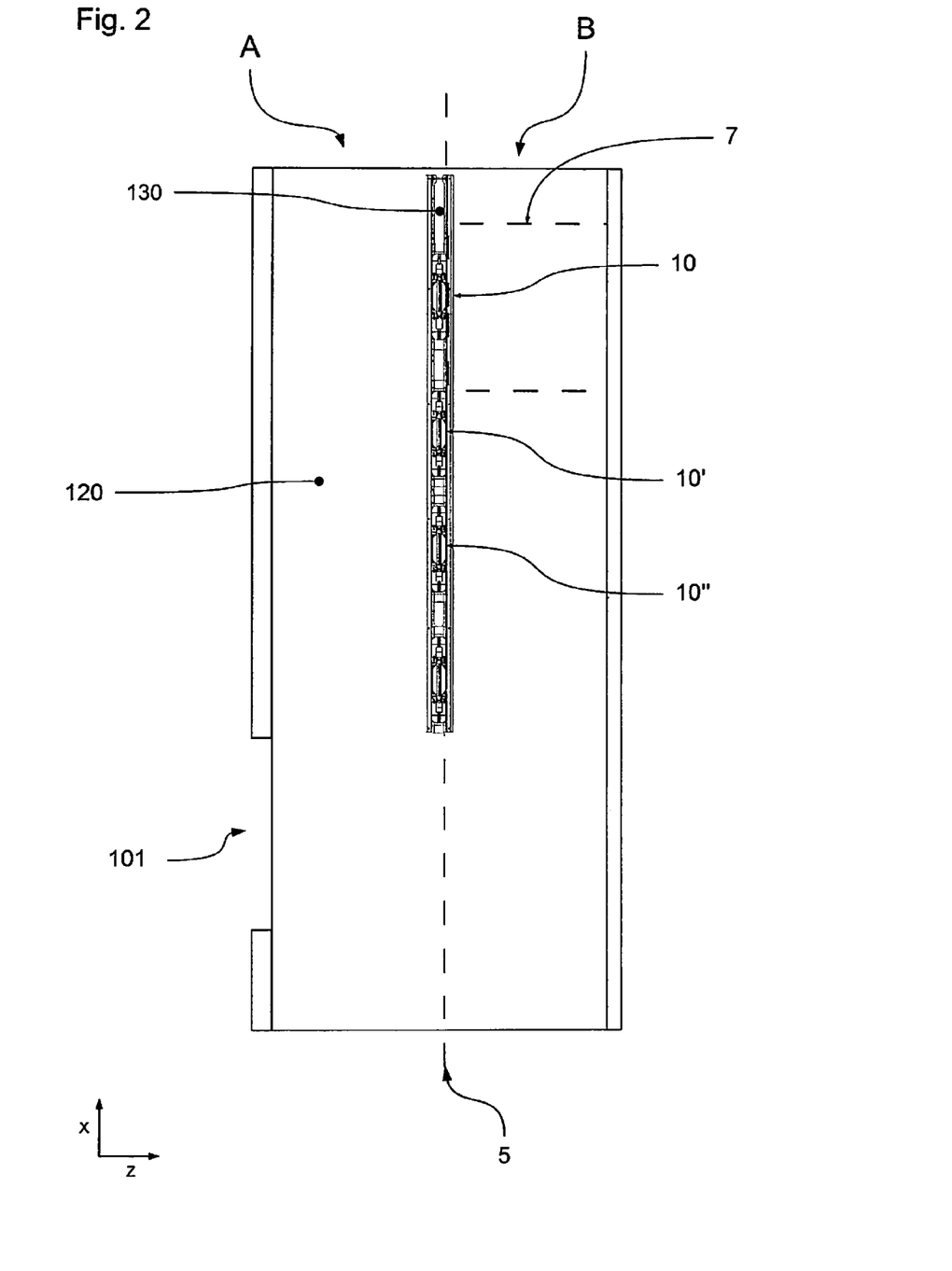
FIG. 2 a schematic plan view onto the cargo loading deck from FIG. 1.

FIG. 2 shows a plan view onto substantially rectangular cargo loading deck 120. Cargo loading deck 120 may have a width of approx. 125 inches and is divided into two halves via a centrally arranged profile rail 130 which extends along aircraft longitudinal direction X. Profile rail 130 runs preferably along a central plane 5 of the aircraft and accommodates a plurality of latch devices 10, 10', 10" (e.g. latches). In addition, lateral guides are provided (not shown in FIG. 2) which in conjunction with profile rail 130 define a cargo loading path A and a cargo loading path B. Depending on the configuration, aircraft 100 can thus be loaded with cargo items, where a cargo item extends over the entire width of cargo loading deck 120 (cargo loading path A and cargo loading path B) (width=125 inches). In a different configuration, profile rail 130 divides cargo loading deck 120 in such a manner that two cargo items in each case can be placed side by side along aircraft transverse direction Y (e.g. width=62 inches). FIG. 2 illustrates schematically a corresponding freight container 7 in cargo loading path B.

Figure 3:
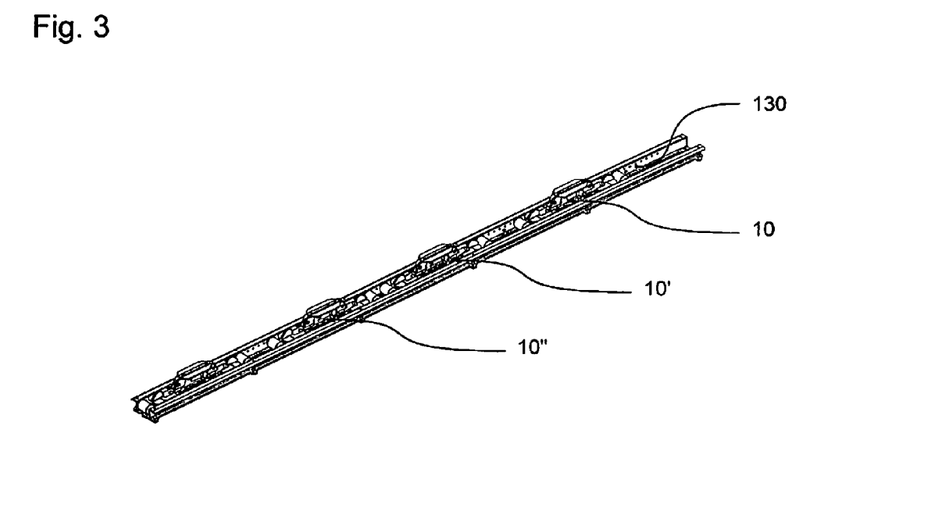
FIG. 3 a perspective view of a profile rail with a plurality of latch devices according to the invention.

FIG. 3 shows a detailed view of profile rail 130 with the plurality of latch devices 10, 10', 10". Provided inside profile rail 130 are rollers which render it possible to transport cargo items easily along aircraft longitudinal direction X in a configuration of cargo loading deck 120.

Figure 4:
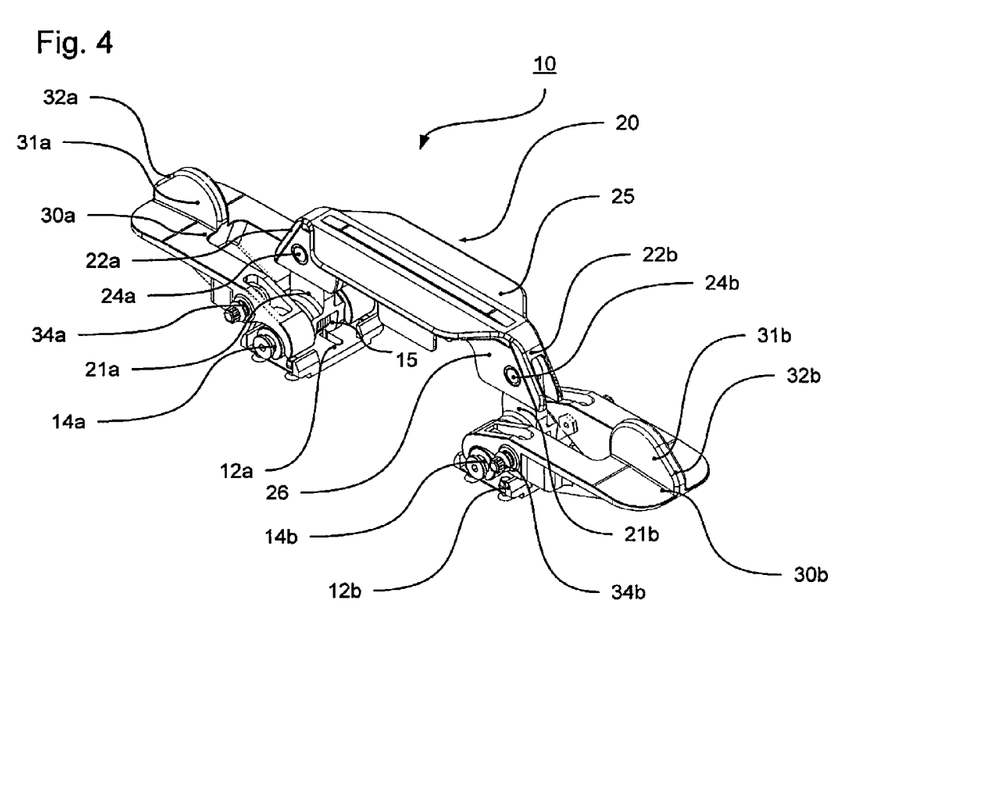
FIG. 4 a perspective detailed view of the latch device according to the invention.
Figure 9:
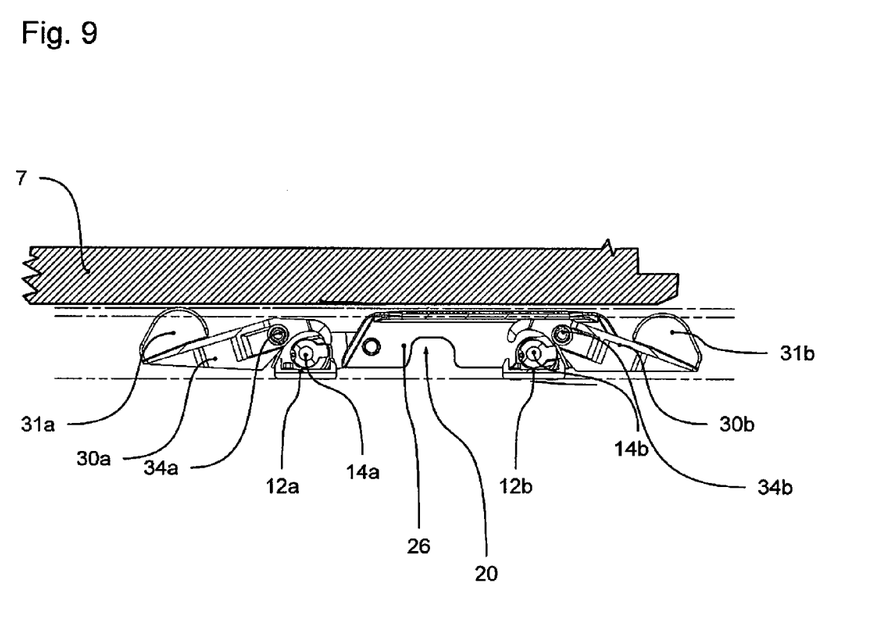
FIG. 9 the latch device from FIG. 4 in an inoperative position in which it is passed over by a freight container.

The perspective detailed view from FIG. 4 illustrates several elements of latch device 10 according to the invention. An essential aspect of this latch device 10 is that a sliding guide carriage 20 can be pivoted out of a restraining position (cf. FIG. 4) into an inoperative position (cf. FIG. 9). Based on the example of cargo loading deck 120 shown in FIG. 2, it can easily be seen that in the restraining position latch device 10 according to the invention facilitates separate loading of cargo loading paths A and B, while in the inoperative position latch device 10 can be passed over by cargo items such that a cargo item can utilise the entire width of cargo loading deck 120. Latch device 10 described folds away downwards when loaded with wide cargo items (cargo loading path A+B).

To improve clarity, FIGS. 4-8 show latch device 10 without profile rail 130, on which it is fastened in the installed condition, with main axles 14a, 14b and auxiliary axles 34a, 34b.

Latch device 10 shown in FIG. 4 is configured essentially symmetrically. First anchor plate 12a and second anchor plate 12b support lifting springs 15 only one of which is shown, and are fastened to profile rail 130. First main axle 14a and second main axle 14b each provide a rotary joint in order to attach a first sliding carriage arm 21a and a second sliding carriage arm 21b rotatably to profile rail 130. In the embodiment illustrated, first sliding carriage arm 21a and first main axle 14a and second sliding carriage arm 21b and second main axle 14b respectively are joined together non-rotatably.

Located on the sides of sliding carriage arms 21a, 21b directed away from main axles 14a, 14b are sliding carriage axles 24a, 24b which each engage rotatably in an elongated sliding guide carriage 20. Main axles 14a, 14b and sliding carriage axles 24a, 24b run parallel to each other in such a way that sliding guide carriage 20 can be pivoted in a translatory movement out of the restraining position into the inoperative position. The individual rotary joints are designed in such a way that sliding guide carriage 20 can be pivoted clockwise or anticlockwise about main axles 14a, 14b as required.

Figure 5:
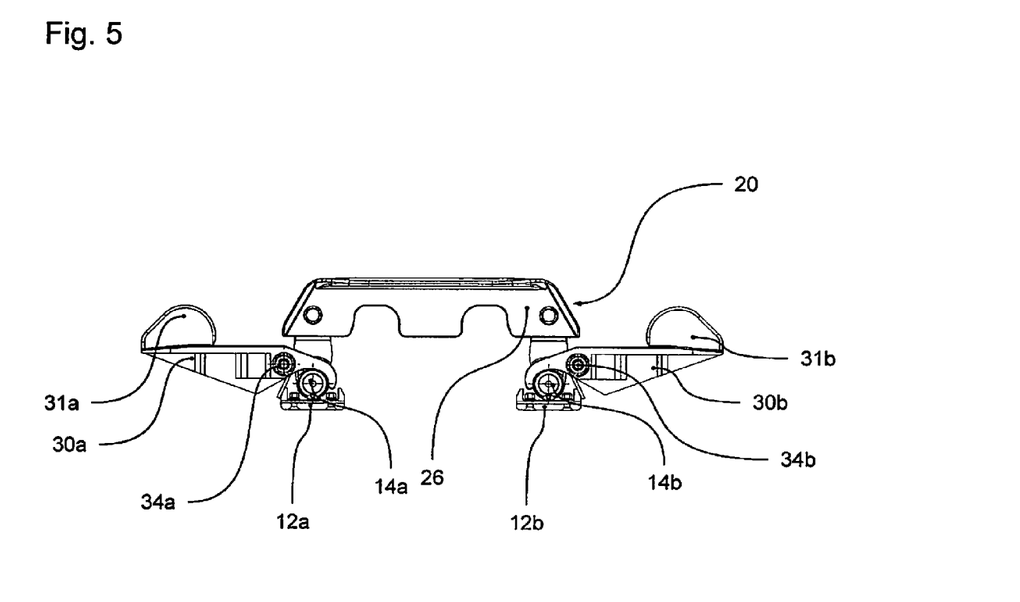
FIG. 5 a lateral view of the latch device from FIG. 4.
Figure 6:
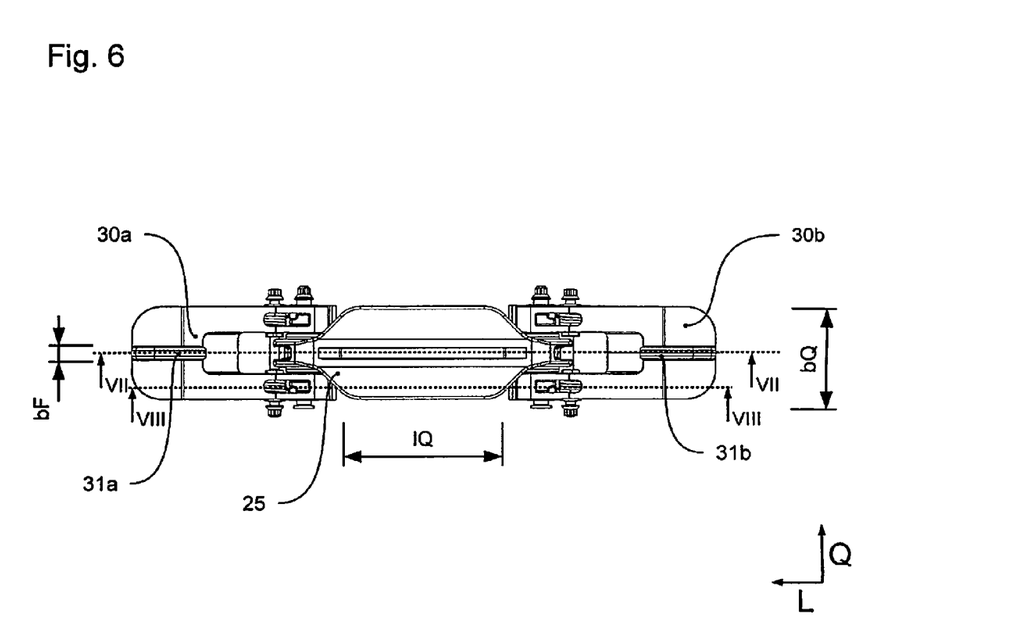
FIG. 6 a plan view onto the latch device from FIG. 4.
Figure 7:
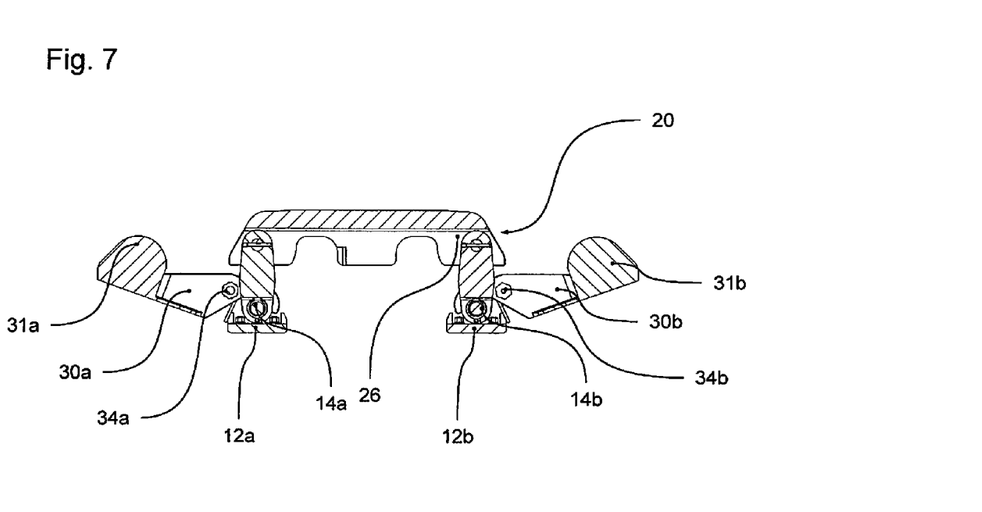
FIG. 7 a longitudinal section through the latch device from FIG. 4.

As also shown in FIGS. 5 and 6, releasing devices 30a, 30b are located on either side of sliding guide carriage 20. First releasing device 30a is rotatably attached to profile rail 130 by means of a first auxiliary axle 34a. Correspondingly, second releasing device 30b is rotatably attached to profile rail 130 by means of a second auxiliary axle 34b. Releasing devices 30a, 30b can be pivoted in the manner of a seesaw, enabling them to be brought out of a blocking position (cf. FIGS. 4, 5 and 8) into a releasing position (cf. FIG. 9). First auxiliary axle 34a is offset in relation to first main axle 14a in longitudinal direction L. Correspondingly, second auxiliary axle 34b is offset in relation to second main axle 14b in longitudinal direction L.

Figure 8:
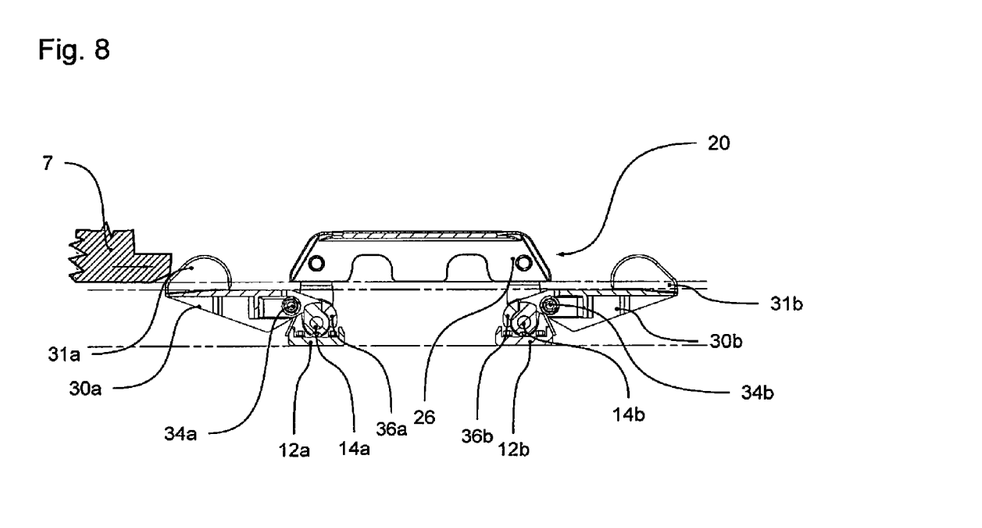
FIG. 8 the latch device from FIG. 4 in a restraining position in which it is approached laterally by a freight container.

As shown in FIG. 8, in the blocking position of first releasing device 30a, a blocking element 36a engages in first main axle 14a or is seated against it in such a way that main axle 14a cannot execute any rotational movement in the clockwise direction (in the image plane of FIG. 8). Main axle 14a is blocked in this direction. Likewise, in the blocking position of second releasing device 30b, a second blocking element 36b engages in second main axle 14b in such a way that said second main axle cannot execute any rotational movement in the anticlockwise direction. Thus, if first and second releasing device 30a, 30b are in the blocking position, sliding guide carriage 20 cannot be pivoted out of the restraining position into the inoperative position. There is no possibility of a movement to the left or the right relative to the image plane of FIG. 8.

It is conceivable to configure releasing devices 30a, 30b in such a way that even one releasing device 30a, 30b is sufficient to prevent sliding guide carriage 20 from pivoting in the clockwise or anticlockwise direction. It is also possible to create a mechanical connection between the releasing devices such that releasing devices 30a, 30b can only be pivoted out of the blocking position into the releasing position simultaneously.

On the side of first releasing device 30a directed away from first blocking element 36a (relative to first auxiliary axle 34a), there is an extension 31a which extends essentially vertically upwards. A second extension 31b is similarly provided on the side of second releasing device 30b directed away from second blocking element 36b. This second extension 31b also extends vertically. Extensions 31a, 31b each form a ramp. As a result, there is a first releasing device ramp section 32a on the side of first releasing device 30a directed away from sliding guide carriage 20 and a second releasing device ramp section 32b on the side of second releasing device 30b directed away from sliding guide carriage 20. These releasing device ramp sections 32a, 32b are configured in such a way that a cargo item (e.g. freight container 7 as shown in FIG. 8) approaching latch device 10 from the side pushes respective releasing device 30a, 30b out of the blocking position into the releasing position.

As shown in FIG. 4, sliding guide carriage 20 also has a first sliding guide carriage ramp section 22a and a second sliding guide carriage ramp section 22b. First sliding guide carriage ramp section 22a is located on the side of sliding guide carriage 20 directed towards first releasing device 30a and second sliding guide carriage ramp section 22b is located on the side of sliding guide carriage 20 directed towards the second releasing device.

If, as shown in FIG. 8, the cargo item approaches latch device 10 from one side, it first pushes respective releasing device 30a, 30 into the releasing position. The cargo item then approaches first or second sliding guide carriage ramp section 22a, 22b and acts on it in such a way that released sliding guide carriage 20 is pivoted out of the restraining position into the inoperative position.

Extensions 31a, 31b may be configured in such a way that they are then also pivoted into their releasing position if they are approached from the side directed away from respective releasing device ramp sections 32a, 32b. However, on being pivoted out of the restraining position into the inoperative position, sliding guide carriage 20 preferably acts in such a way on respective other releasing device 30a, 30b that it is automatically pivoted into the releasing position. That is to say, when freight container 7, as shown in FIG. 8, approaches first releasing device 30a from the left, sliding guide carriage 20 is released in such a way that it can carry out a translatory movement downwards to the right. This translatory movement leads to second sliding guide carriage ramp section 22b acting on second releasing device 30b in such a way that said releasing device is pivoted out of the blocking position into the releasing position.

Latch device 10 preferably has spring assemblies which push sliding guide carriage 20 into the restraining position and releasing devices 30a, 30b into the blocking position. In the embodiment described, latch device 10 is configured in such a way that, in spite of the spring assemblies, releasing devices 30a, 30b can only return to the respective releasing position when sliding guide carriage 20 swings back into the restraining position. A device for consciously locking the sliding guide carriage in the inoperative position is additionally conceivable so that the locking unit can be stowed permanently in the cargo hold floor if required.

As shown in FIGS. 5 and 6, sliding guide carriage 20 comprises a cross member 25 which extends substantially vertically, and a longitudinal member 26 which extends substantially horizontally. Cross member 25 protrudes transversally, i.e. over and beyond longitudinal member 26 such that a type of T-section emerges. Cross member 25 can grip a frame structure of the cargo items in such a way that they are secured along the aircraft's Z-axis. Ultimately, this configuration of the sliding guide carriage 20 prevents a cargo item from jumping out of one of cargo loading paths A, B during the flight.

In the embodiment illustrated, cross member 25 has a cross member length IQ of approx. 15 cm and a cross member width bQ of approx. 6 cm. Cross member width bQ is preferably significantly greater than an extension width bF. In the embodiment illustrated, extension width bF of extensions 31a, 31b is approximately equal to 1 cm.

It should be pointed out in addition that, in the embodiment described, extensions 31a, 31b are significantly distant in longitudinal direction L of latch device 10 from sliding guide carriage 20 in its restraining position. This distance can, for example, be greater than 2 cm, preferably greater than 4 cm.

Even if the latch device previously described has two releasing devices 30a, 30b, it is easily conceivable to provide only one releasing device 30a on one side of the sliding guide carriage. In this respect, it would be conceivable for sliding guide carriage 20 only to lower when it is approached from the side on which corresponding releasing device 30a, 30b is located.

Moreover, the rotary joints of main axles 14a, 14b and auxiliary axles 34a, 34b form a bearing which renders it possible to pivot sliding guide carriage 20 in an appropriate manner. It is possible to replace the rotary joints with a slotted guide system.

Latch device 10 described is anchored in profile rail 130. However, latch device 10 provided with a frame can also be arranged directly on or in cargo loading deck 120.

In the embodiment illustrated, cross member 25 protrudes beyond longitudinal member 26 on both sides. It would be possible to dispense entirely with cross member 25 or to configure it in such a manner that it only protrudes over longitudinal cross member 26 on one side.

LIST OF REFERENCE NUMBERS

5 Central plane
7 Freight container
10, 10', 10" Latch device
12a, 12b Anchor plate
14a, 14b Main axle
15 Lifting spring
20 Sliding guide carriage
21a, 21b Sliding carriage arm
22a, 22b Sliding guide carriage ramp section
24a, 24b Sliding carriage axle
25 Cross member
26 Longitudinal member
30a, 30b Releasing device 31a, 31b Extension
32a, 32b Releasing device ramp section
34a, 34b Auxiliary axle
36a, 36b Blocking element
100 Aircraft
101 Cargo hatch
102 Tail
103 Nose
120 Cargo loading deck
130 Profile rail
A Cargo loading path A
B Cargo loading path B
X Longitudinal direction of the aircraft
Y Transverse direction of the aircraft
Z Z-axis of the aircraft
L Longitudinal direction of the latch device
Q Transverse direction of the latch device
bF Extension width
bQ Cross member width
lQ Cross member length

What is claimed is:

1. Latch device for securing or guiding at least one cargo item on a cargo loading deck, comprising:
a sliding guide carriage extending longitudinally, the sliding guide carriage comprising a cross member for forming a T-section;
a bearing in which the sliding guide carriage is movably supported in such a way that the sliding guide carriage is pivotable out of a restraining position into an inoperative position;
at least one releasing device which is attached to the latch device by way of at least one articulation in such a way that the releasing device can be brought out of a blocking position into a releasing position, wherein in the blocking position the releasing device acts on the sliding guide carriage in such a manner that said carriage is locked in the restraining position, wherein the releasing device has at least one releasing device ramp section which is designed and arranged in such a manner that a cargo item approaching longitudinally pivots the releasing device out of the blocking position into the releasing position.

2. Latch device according to claim 1, including at least two releasing devices which are arranged on either side of the sliding guide carriage along the longitudinal direction.

3. Latch device according to claim 1, wherein the sliding guide carriage has at least one sliding guide carriage ramp section, which is arranged and configured in such a manner that a cargo item approaching longitudinally pivots the sliding guide carriage out of the restraining position into the inoperative position, wherein the sliding guide carriage ramp is arranged on a side of said sliding guide carriage.

4. Latch device according to claim 1, wherein the bearing for guiding the sliding guide carriage out of the restraining position into the inoperative position in a translatory movement has at least one slotted guide system.

5. Latch device according to claim 1, including at least one extension on the at least one releasing device for accommodating the at least one releasing device ramp section.

6. Latch device according to claim 5, wherein the at least one extension has a width of less than about 3 cm.

7. Latch device according to claim 5, wherein the at least one extension has a width which is narrower than the width of the cross member of the sliding guide carriage.

8. Latch device according to claim 1, including at least one spring assembly which preloads the sliding guide carriage in the restraining position.

9. Latch device according to claim 1, including at least one anchor plate for attaching the latch device to the cargo loading deck.

10. Cargo loading deck comprising at least one latch device according to claim 1.

11. Cargo loading deck according to claim 10, wherein the at least one latch device is arranged on the cargo loading deck to form at least one first cargo conveying path and at least one second cargo conveying path.

12. Latch device according to claim 1, wherein the sliding guide carriage has a first sliding guide carriage ramp section and a second sliding guide carriage ramp section, the sliding guide carriage ramps being arranged on each side of the sliding guide carriage.

13. Latch device according to claim 1, wherein the bearing for guiding the slide guide carriage out of the restraining position into the inoperative position in a translatory movement includes a plurality of rotary joints.

14. Latch device according to claim 1, including at least one spring assembly which preloads the releasing device in the blocking position.

15. Latch device according to claim 1, including at least one anchor plate for attaching the latch device to a profile rail.

16. A latch device for securing or guiding at least one cargo item on a cargo loading deck, comprising:
a sliding guide carriage extending longitudinally;
a bearing in which the sliding guide carriage is movably supported in such a way that the sliding guide carriage is pivotable out of a restraining position into an inoperative position;
at least one releasing device which is attached to the latch device by way of at least one articulation in such a way that the releasing device can be brought out of a blocking position into a releasing position, wherein in the blocking position the releasing device acts on the sliding guide carriage in such a manner that said carriage is locked in the restraining position, wherein the releasing device has at least one releasing device ramp section which is designed and arranged in such a manner that a cargo item approaching longitudinally pivots the releasing device out of the blocking position into the releasing position;
at least one extension on the at least one releasing device for accommodating the at least one releasing device ramp section, the at least one extension having a width of less than about 3 cm.

17. A latch device for securing or guiding at least one cargo item on a cargo loading deck comprising:
a sliding guide carriage extending longitudinally;
a bearing in which the sliding guide carriage is movably supported in such a way that the sliding guide carriage is pivotable out of a restraining position into an inoperative position, wherein the sliding guide carriage is pivotally connected to a first sliding carriage arm by a first sliding carriage axle and to a second sliding carriage arm by a second sliding carriage axle such that the sliding guide carriage folds from the restraining position into the inoperative position in a translatory movement by rotating around the first and second sliding carriage axle;
at least one releasing device which is attached to the latch device by way of at least one articulation in such a way that the releasing device can be brought out of a blocking position into a releasing position, wherein in the blocking position the releasing device acts on the sliding guide carriage in such a manner that said carriage is locked in the restraining position,
wherein the releasing device has at least one releasing device ramp section which is designed and arranged in such a manner that a cargo item approaching longitudinally pivots the releasing device out of the blocking position into the releasing position.

\* \* \* \* \*